US009825857B2

(12) United States Patent
Banerjee et al.

(10) Patent No.: US 9,825,857 B2
(45) Date of Patent: Nov. 21, 2017

(54) METHOD FOR INCREASING LAYER-3 LONGEST PREFIX MATCH SCALE

(71) Applicant: Cisco Technology, Inc., San Jose, CA (US)

(72) Inventors: Ayan Banerjee, Fremont, CA (US); Sameer Merchant, San Jose, CA (US); Ramana Mellacheruvu, Sunnyvale, CA (US); Ramesh V. N. Ponnapalli, Sunnyvale, CA (US); Srinivasan Ramabadran, Sunnyvale, CA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 108 days.

(21) Appl. No.: 14/449,007

(22) Filed: Jul. 31, 2014

(65) Prior Publication Data
US 2015/0124633 A1 May 7, 2015

Related U.S. Application Data

(60) Provisional application No. 61/900,353, filed on Nov. 5, 2013.

(51) Int. Cl.
H04L 12/741 (2013.01)
H04L 12/58 (2006.01)
H04W 28/12 (2009.01)
H04W 72/00 (2009.01)
H04L 12/721 (2013.01)
H04L 12/801 (2013.01)
(Continued)

(52) U.S. Cl.
CPC ........... H04L 45/745 (2013.01); H04L 45/16 (2013.01); H04L 45/72 (2013.01); H04L 45/748 (2013.01); H04L 47/33 (2013.01); H04L 51/10 (2013.01); H04W 28/12 (2013.01); H04W 72/005 (2013.01)

(58) Field of Classification Search
USPC ......................................................... 370/252
See application file for complete search history.

(56) References Cited

U.S. PATENT DOCUMENTS 6,735,198 B1   5/2004  Edsall et al.
6,954,463 B1   10/2005 Ma et al.
(Continued)

FOREIGN PATENT DOCUMENTS

WO    WO 02/052442    7/2002

OTHER PUBLICATIONS

International Search Report and Written Opinion for International Application No. PCT/US2014/063252, dated May 4, 2015.
(Continued)

Primary Examiner — Hanh N Nguyen
Assistant Examiner — Jose L Perez
(74) Attorney, Agent, or Firm — Polsinelli PC

(57) ABSTRACT

Various embodiments are disclosed for increasing Layer-3 LPM (longest prefix match) routing database in a network platform. In some embodiments, chipsets in fabric modules (FMs) can be partitioned into multiple banks. Network traffic can be directed towards a corresponding bank in the FMs by using a LPM table on a line card (LC). Entries in the LPM table on the LC can be programmed either statically or dynamically based upon LPM routes that are dynamically learned.

16 Claims, 6 Drawing Sheets

(51) Int. Cl.
*H04L 12/761* (2013.01)
*H04L 12/745* (2013.01)

(56) References Cited

U.S. PATENT DOCUMENTS

| | | | |
|---|---|---|---|
| 6,996,099 B1* | 2/2006 | Kadambi | H04L 69/161 370/389 |
| 7,313,666 B1 | 12/2007 | Saminda De Silva et al. | |
| 8,687,629 B1 | 4/2014 | Kompella et al. | |
| 2002/0126671 A1* | 9/2002 | Ellis | H04L 12/18 370/390 |
| 2003/0067924 A1 | 4/2003 | Choe et al. | |
| 2004/0073715 A1* | 4/2004 | Folkes | H04L 45/00 709/250 |
| 2005/0105524 A1 | 5/2005 | Stevens et al. | |
| 2005/0141517 A1 | 6/2005 | Choi et al. | |
| 2008/0130601 A1 | 6/2008 | Kim et al. | |
| 2008/0151863 A1 | 6/2008 | Lawrence et al. | |
| 2008/0225853 A1* | 9/2008 | Melman | H04L 12/4625 370/392 |
| 2010/0150155 A1 | 6/2010 | Napierala | |
| 2011/0038375 A1 | 2/2011 | Liu et al. | |
| 2011/0122889 A1 | 5/2011 | Pacella et al. | |
| 2011/0228795 A1* | 9/2011 | Agrawal | H04L 49/9047 370/417 |
| 2011/0249682 A1 | 10/2011 | Kean et al. | |
| 2011/0307656 A1 | 12/2011 | Hamdi et al. | |
| 2014/0146824 A1 | 5/2014 | Angst et al. | |
| 2014/0244779 A1* | 8/2014 | Roitshtein | H04L 61/103 709/213 |
| 2015/0124684 A1 | 5/2015 | Banerjee et al. | |
| 2015/0124806 A1 | 5/2015 | Banerjee et al. | |
| 2015/0236900 A1 | 8/2015 | Chung | |

OTHER PUBLICATIONS

International Search Report and Written Opinion for PCT/US2014/063245, dated Mar. 23, 2015, 11 pages.
International Search Report and Written Opinions for PCT/US2014/063577, dated Jan. 30, 2015, 10 pages.

* cited by examiner

METHOD FOR INCREASING LAYER-3 LONGEST PREFIX MATCH SCALE

CROSS REFERENCE TO RELATED APPLICATION

This application claims priority to U.S. Provisional Patent Application No. 61/900,353, filed Nov. 5, 2013, which is expressly incorporated herein by references in its entirety.

TECHNICAL FIELD

The present disclosure relates generally to a forwarding engine in a telecommunications network.

BACKGROUND

There are many limitations in the conventional data packet routing and switching technologies. One limitation is that, in many network platforms, a forwarding engine is programmed identically across all cards, and thus a scale of a box is limited to a table size of the single forwarding engine. The scale of the box can be even more limited in a standalone end of a row (EOR) switch because the box performs hierarchical routing, with Layer-2 MAC and Layer-3 host routes programmed identically on the line cards (LCs) and Layer-3 longest prefix match (LPM) routes programmed identically on the fabric modules (FMs). Another limitation is that, in network platforms, most forwarding tables are programmed symmetrically on all forwarding engines. Therefore, there is a need to scale the Layer-3 LPM routes to larger values.

BRIEF DESCRIPTION OF THE DRAWINGS

In order to describe the manner in which the above-recited and other advantages and features of the disclosure can be obtained, a more particular description of the principles briefly described above will be rendered by reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which.

DETAILED DESCRIPTION

Figure 1:
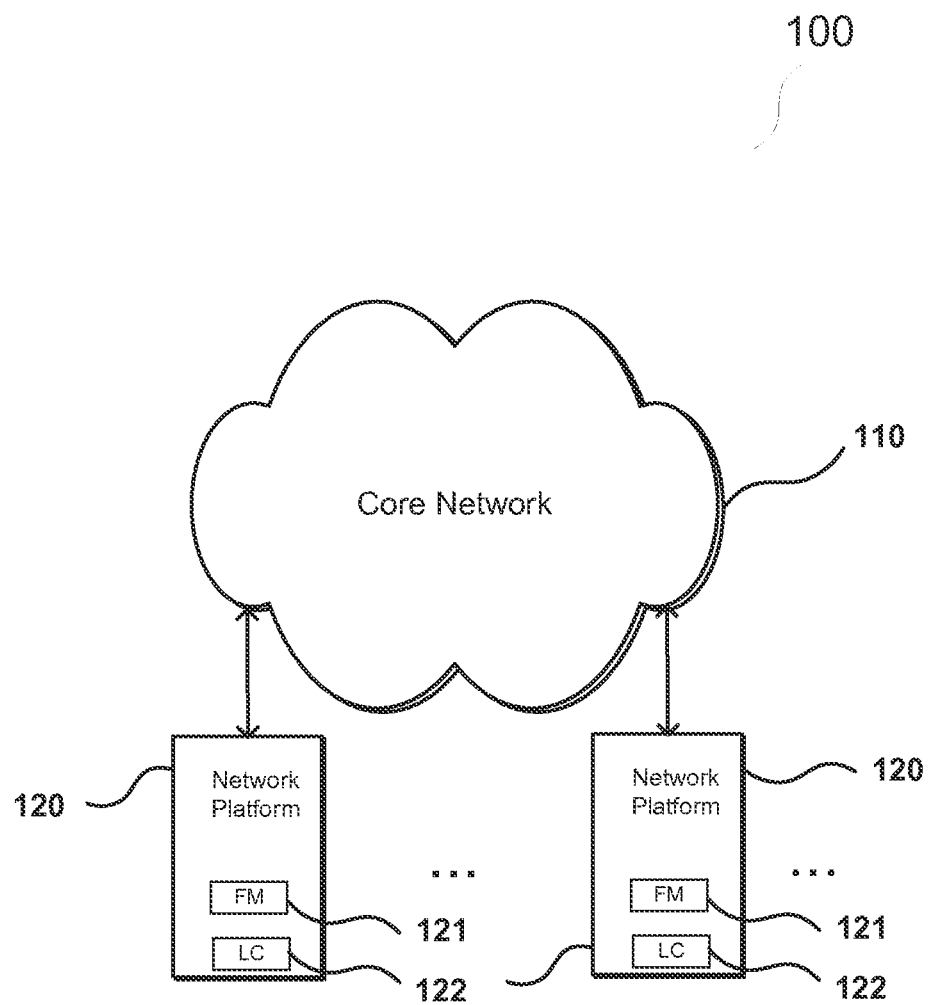
FIG. 1 illustrates an example system for increasing Layer-3 longest prefix match (LPM) routes in a telecommunications network in accordance with various embodiments.

Systems and methods in accordance with various embodiments of the present disclosure provide a solution to the above-mentioned problems by increasing Layer-3 longest prefix match (LPM) routing database in a network platform. More specifically, various embodiments of the present disclosure provide methods for partitioning chipsets in fabric modules (FMs) into multiple banks and using the LPM space on line cards (LCs) to direct network traffic towards corresponding banks in the FMs.

In many instances, chipsets (e.g., Trident (T2) modules) in FMs can be split into K (e.g., K=2) banks. Bank i (e.g., $1 \leq i \leq K$) on each FM can be given the same virtual module (VM) identifier. VM identifier is used for forwarding network packets among chipsets (e.g., T2 modules). For example, a LC may have two entries in a LPM table with one of the entries pointing to one or more Even-FMs and another entry pointing to one or more Odd-FMs. The one or more Even-FMs can be programmed with even IP addresses while the one or more Odd-FMs can be programmed with odd IP addresses.

In some embodiments, each of two or more banks in a FM can be reached by using 16K LPM space in a LC. Each LPM route can be programmed by directing the LPM route to a corresponding bank in the FM. For example, a LC may have a maximum 16K entries in a LPM table in an IPv4 32-bit space (e.g., entry #1 0.0.0.0/14 pointing to Bank-E-FM, entry #2 0.0.32.0/14 pointing to Bank-O-FM, entry #3 0.0.128.0/14 pointing to Bank-E-FM, . . . Entry #16K 0.0.128.0/14 pointing to 255.255.192.0/14 pointing to Bank-O-FM). Even FMs can be programmed with IP addresses that are in the range of Bank-E-FM while Odd FMs can be programmed with IP addresses that are in the range of Bank-O-FM. In some embodiments, chipsets in each FM are programmed identically such that K*128K LPM entries can be programmed across FMs.

In some embodiments, a LPM space on a LC can be programmed statically. For example, /14 LPM routes in an IPv4 32-bit space can be programmed by taking 16K LC LPM space. LPM next-hops can be distributed to K different banks of a FM, which splits the IP address space into K buckets.

In some embodiments, a LPM space on a LC can be programmed dynamically. Selective downloading can be used to increase the number of routes to a LC based upon the participation of the LC in virtual routing and forwarding (VRF) or virtual design and construction (VDC). Each entry in a LPM table can be added and hashed to one of the K virtual banks in a FM based upon routes that are dynamically learnt. For example, /26, /24, /23 and /22 routes are typically expected in an IPv4 32-bit space. A 16K LPM space on a LC can be carved to X1/(26−1=25), X2/23, X3/22, X4/21 and/or a default route, a sum of which equals to 16K entries. A ratio of X1:X2:X3:X4 can be set to 3:4:3:3 based upon expected route patterns. Thus, by directing these "granular" 16K LPM routes in a LC towards K coarse banks in a FM, the 16K LPM route space can be effectively spread across FMs. It should be understood that this is an example ratio for a prefix pattern. There can be many alternative ratios for the prefix pattern within the scope of the various embodiments unless otherwise stated. In some embodiments, in response to LPM routes becoming too "granular," LPM routes in a LC may be aggregated up by 1 bit-level to ensure that the LPM routes fit in the LPM space of the LC (e.g., 16K in an IPv4 32-bit space).

In some embodiments, based at least upon measured traffic flows on each bank of a FM, traffic spreads can be moved close to each other across all banks in the FM by switching granular LPM routes from pointing toward existing banks to suitable banks in the FM In some implementations, granular routes can be switched between banks of a FM according to a make-before-break approach, in which a new bank and an old bank are both made available before the granular routes are switched from the old bank to the new bank to ensure no traffic loss. In some optional embodiments, a built-in hysteresis can be added to a determination whether to switch a granular route from one bank to another bank in a FM. The built-in hysteresis can help prevent moving granular routes between banks in the FM too frequently.

FIG. 1 illustrates an example system 100 for increasing Layer-3 LPM routes in a telecommunications network in accordance with various embodiments. In this example, the system 100 comprises at least one network platform 120 in communication with a core network 110 (e.g., Layer-2/Layer-3 boundary and aggregation network). In some implementations, one of the at least one network platform 120 can be an end-of-row (EOR) switch that includes at least one FM 121 used for inter-line card connections, and at least one LC 122 subtending user front facing ports in the at least one network platform 120. Each of the at least one FM 121 and the at least one LC 122 may include two or more chipsets (e.g., Trident chips). In some implementations, the EOR switch further includes a rack or cabinet at either end of a server row for the purpose of providing network connectivity to servers within the server row. The servers within the server row can be treated line one holistic unit with the system 100.

In some embodiments, a forward plane in the network platform 120 (not shown) may be programmed such that at least one LC 122 all have the same entries with respect to Layer-2 media access control (MAC) entries and Layer-3 /32 host entries. The forward plane may also have a default route programmed to send all Layer-3 packets to the at least one FM 121. All of the at least one FM 121 may have identical Layer-3 LPM entries.

Although only FMs 121 and LCs 122 are shown within the network platform 120 in FIG. 1, various types of electronic or computing devices that are capable of receiving and forwarding network packets may also be included. The computing device may use operating systems that include, but are not limited to, Android, Berkeley Software Distribution (BSD), iPhone OS (iOS), Linus, OS X, Unix-like Real-time Operating System (e.g., QNX), Microsoft Windows, Window Phone, and IBM z/OS.

Depending on the desired implementation in the system 100, a variety of networking and messaging protocols may be used, including but not limited to TCP/IP, open systems interconnection (OSI), file transfer protocol (FTP), universal plug and play (UpnP), network file system (NFS), common internet file system (CIFS), AppleTalk etc. As would be appreciated by those skilled in the art, the system 100 illustrated in FIG. 1 is used for purposes of explanation, a network system may be implemented with many variations, as appropriate, in the configuration of network platform in accordance with various embodiments of the present disclosure.

In this example, the network platform 120 might also include one or more wireless components operable to communicate with one or more electronic devices within a computing range of the particular wireless channel. The wireless channel can be any appropriate channel used to enable devices to communicate wirelessly, such as Bluetooth, cellular, NFC, or Wi-Fi channels. It should be understood that the device can have one or more conventional wired communications connections, as known in the art.

The network platform 120 might also include power components, such as conventional plug-in approaches, a battery operable to be recharged through conventional plug-in approaches, or through other approaches such as wireless (e.g., capacitive or inductive) charging through proximity with a power mat or other such device. Various other elements and/or combinations are possible as well within the scope of various embodiments.

Figure 2:
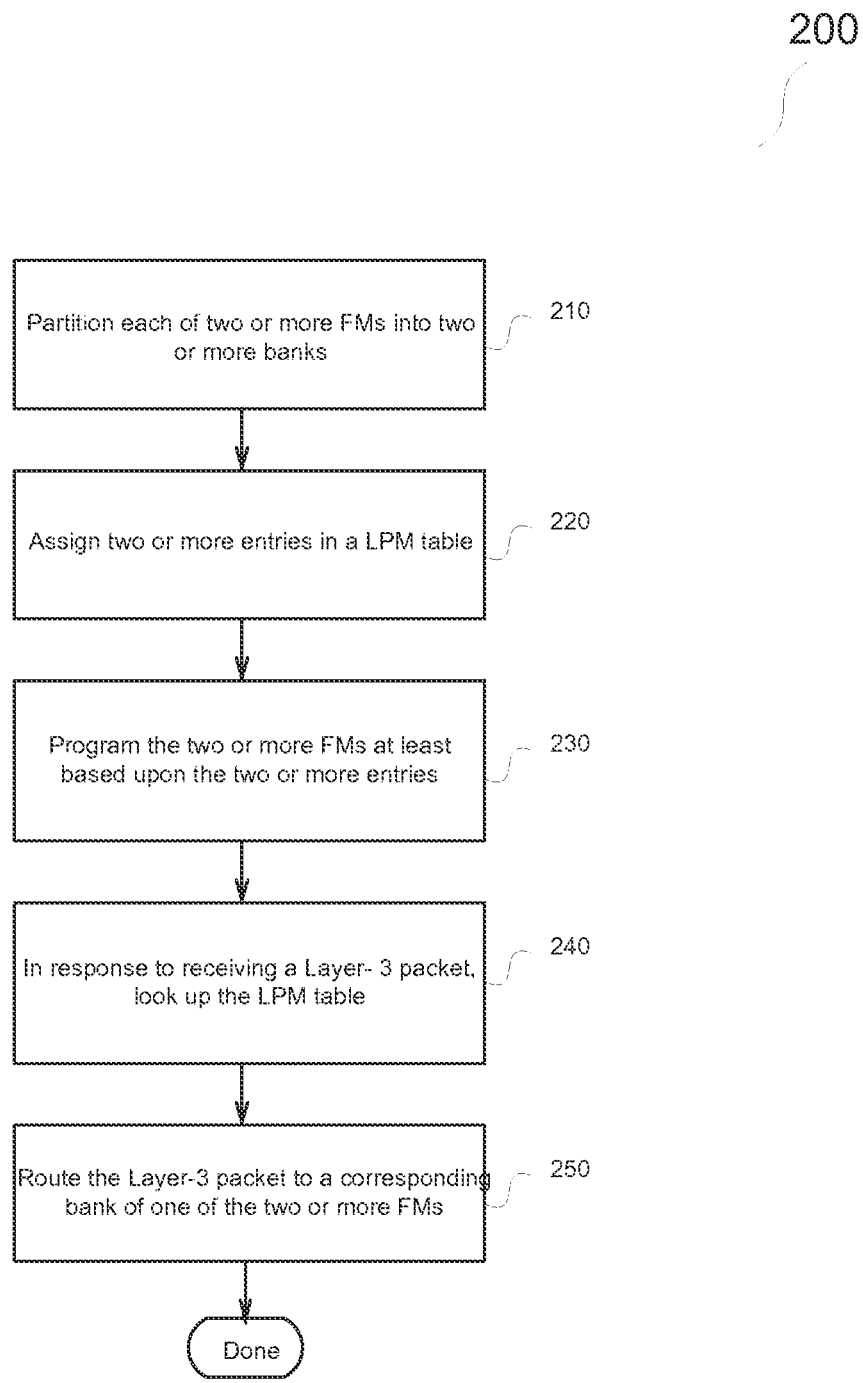
FIG. 2 illustrates an example process of increasing Layer-3 LPM routes in accordance with various embodiments.

FIG. 2 illustrates an example process 200 of increasing Layer-3 LPM routes in accordance with various embodiments. It should be understood that there can be additional, fewer, or alternative steps performed in similar or alternative orders, or in parallel, within the scope of the various embodiments unless otherwise stated. The example method embodiment 200 starts with partitioning each of two or more FMs into two or more banks, at step 210. In some embodiments, chipsets in each FM can be grouped into the two or more banks. VM identifier may be used for forwarding Layer-3 packets among chipsets of FMs. Two or more entries may be assigned to a LPM table of a LC, at step 220. The two or more FMs are programmed at least based upon the two or more assigned entries in the LPM table, at step 230. For example, if two entries assigned in the LPM table, one of two entries can be pointed to even FMs with even IP addresses while the other entry can be pointed to odd FMs with odd IP addresses.

In response to receiving a Layer-3 packet, the Layer-3 packet can be looked up in the LPM table, at step 240. According to the LPM table, the Layer-3 packet is then routed to a corresponding bank of one of the two or more FMs, at step 250. In some embodiments, the Layer-3 packet can be routed to a default FM if no match can be found in the LPM table.

Figure 3:
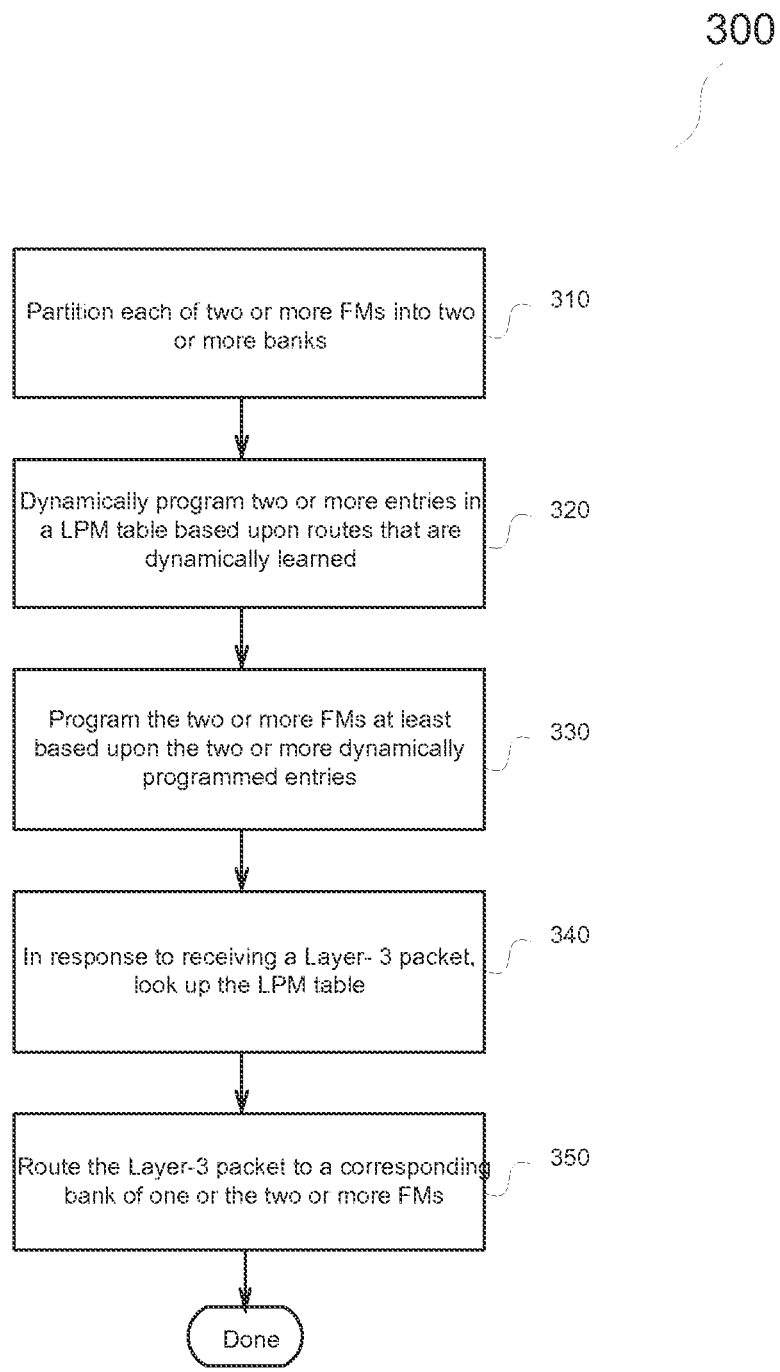
FIG. 3 illustrates another example process of increasing Layer-3 LPM routes in accordance with various embodiments.

FIG. 3 illustrates another example process 300 of increasing Layer-3 LPM routes in accordance with various embodiments. The example method embodiment 300 starts with partitioning each of two or more FMs into two or more banks, at step 310. Chipsets in each FM may be grouped according to the two or more partitioned banks. Two or more entries may be dynamically assigned to a LPM table of a LC based upon routes that are dynamically learned, at step 320. The two or more FMs are programmed at least based upon the two or more dynamically programmed entries in the LPM table, at step 330. In some embodiments, each bank of the two or more FMs can be reached by using 16K LPM space in the LC. Each LPM route is programmed by directing the LPM route to the corresponding bank of these FMs. In some embodiments, selective download can be used to increase the number of routes to the LC based upon the participation of the LC in VRFs or VDCs. Each entry in the LPM table can be added or deleted based upon routes that are dynamically learnt. Each entry in the LPM table is hashed towards one of the two or more banks in the FMs.

In some embodiments, the granularity of these LPM routes can be adjusted. For example, if the LPM routes become too "granular," LPM routes in the LC may be aggregated up by 1-bit level to ensure the LPM routes fit in the LPM table of the LC. In some embodiments, traffic spreads can be move close to each other across the two or more banks in the FMs by switching the LPM routes from pointing toward existing banks to suitable banks of the FMs. In some instances, a new bank and an old bank are both made available before a granular LPM route is switched from the old bank to the new bank. In some embodiments, a built-in hysteresis can be added in determining whether to switch a granular route from one bank to another bank in the FMs.

In response to receiving a Layer-3 packet, the Layer-3 packet can be looked up in the LPM table with dynamically programmed entries, at step 340. According to the LPM table, the Layer-3 packet is then routed to a corresponding bank of one of the two or more FMs, at step 350. In some embodiments, the Layer-3 packet can be routed to a default FM if no match can be found in the LPM table.

Figure 4:
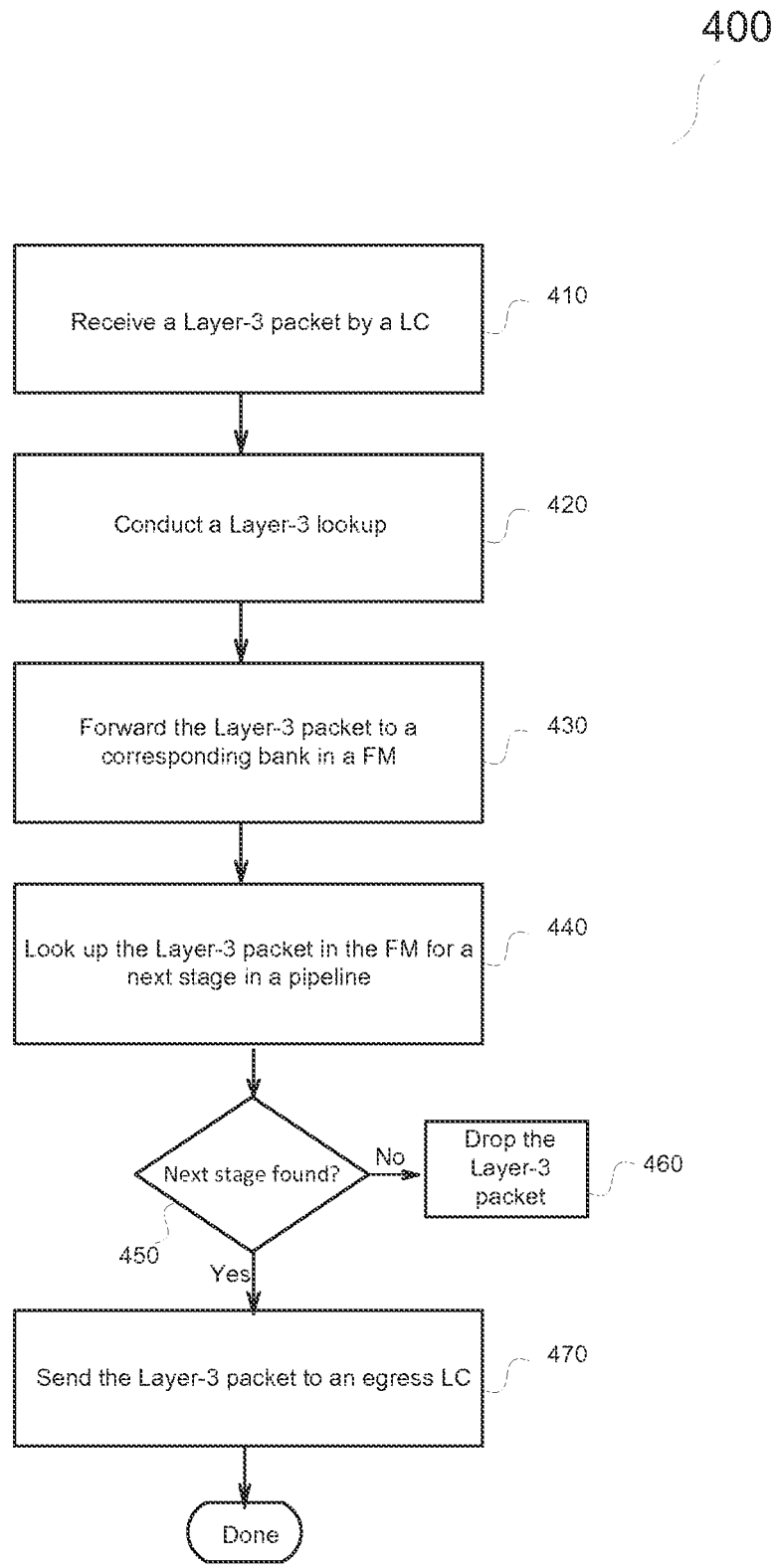
FIG. 4 illustrates an example process of forwarding a Layer-3 packet with increased Layer-3 LPM routes in accordance with various embodiments.

FIG. 4 illustrates an example process 400 of forwarding a Layer-3 packet with increased Layer-3 LPM routes in accordance with various embodiments. It should be understood that there can be additional, fewer, or alternative steps performed in similar or alternative orders, or in parallel, within the scope of the various embodiments unless otherwise stated. The example method embodiment 400 starts with receiving a Layer-3 packet by a LC, at step 410. A Layer-3 lookup can be conducted on a LC to determine whether to send the Layer-3 packet to one of two or more FMs for a switching lookup or let the Layer-3 packet exit on the LC, at step 420. Each of the two or more FMs is partitioned into two or more banks. Entries in a lookup table on the LC can be programmed either statically or dynamically based upon LPM routes that are dynamically learned.

Based upon look-up results on the LC, the Layer-3 packet can be forwarded to a corresponding bank in one of the two or more FMs, at step 430. The Layer-3 packet is then looked up in the FM for a next stage in a pipeline, at step 440. A determination can be made whether the next stage can be found, at step 450. If the next stage cannot be found, the Layer-3 packet is dropped, at step 460. If the next stage can be found, the Layer-3 packet is forwarded to an egress LC to be sent onwards to the next stage in the pipeline, at step 470.

Figure 5:
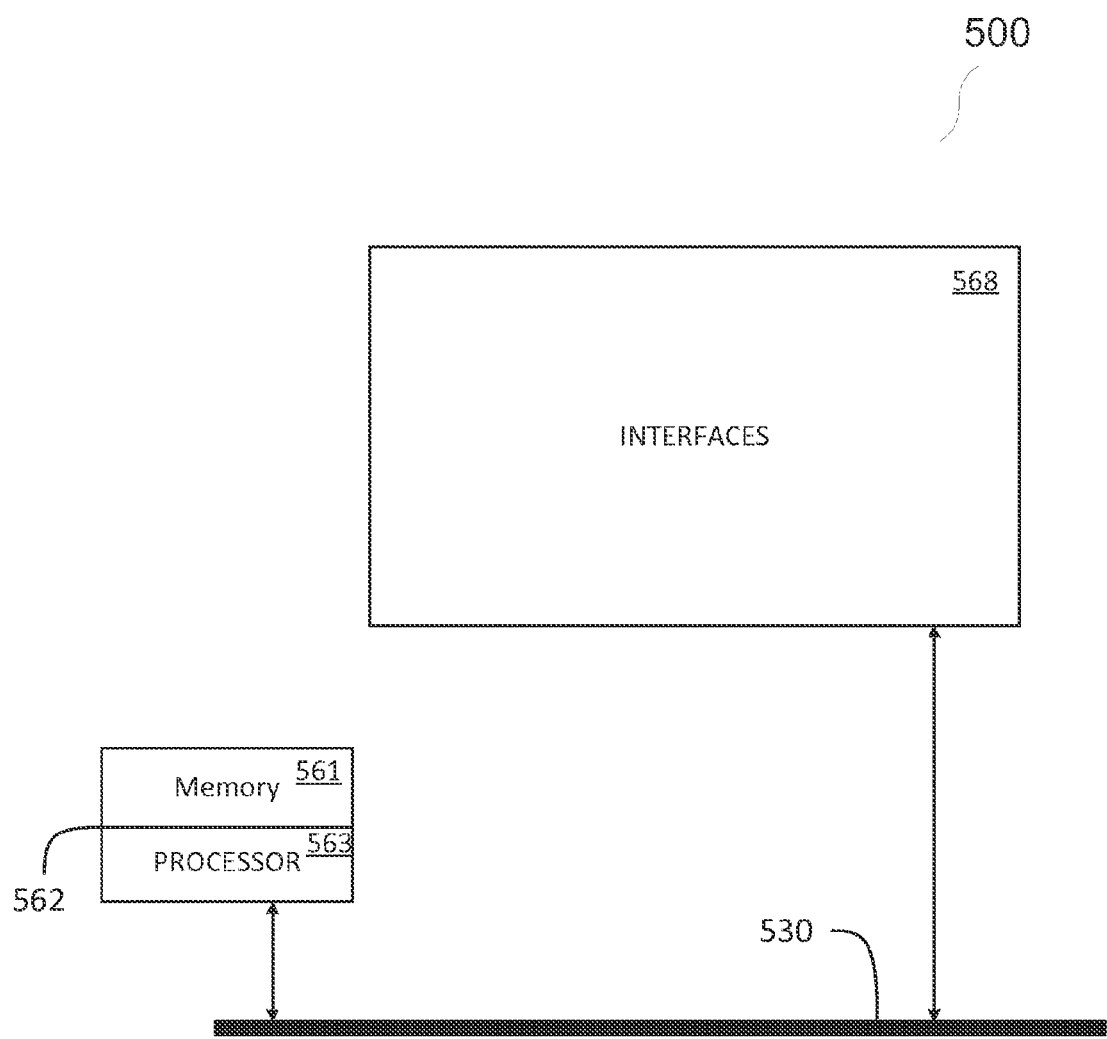
FIG. 5 illustrates an exemplary network device in accordance with various embodiments.

FIG. 5 illustrates an exemplary network device 500 in accordance with various embodiments. Network device 510 includes a master central processing unit (CPU) 562, interfaces 568, and a bus 515 (e.g., a PCI bus). When acting under the control of appropriate software or firmware, the CPU 562 is responsible for all computation. It preferably accomplishes all these functions under the control of software including an operating system and any appropriate applications software. The CPU 562 may include one or more processors 563 such as a processor from the Motorola family of microprocessors or the MIPS family of microprocessors. In an alternative embodiment, the one or more processors 563 are specially designed hardware for controlling the operations of the network device 500. In a specific embodiment, a memory 561 (such as non-volatile RAM and/or ROM) also forms part of CPU 562. However, there are many different ways in which memory could be coupled to the system.

The interfaces 568 are typically provided as interface cards (sometimes referred to as "line cards"). Generally, they control the sending and receiving of data packets over the network and sometimes support other peripherals used with the network device 500. Among the interfaces that may be provided are Ethernet interfaces, frame relay interfaces, cable interfaces, DSL interfaces, token ring interfaces, and the like. In addition, various very high-speed interfaces may be provided such as fast token ring interfaces, wireless interfaces, Ethernet interfaces, Gigabit Ethernet interfaces, ATM interfaces, HSSI interfaces, POS interfaces, FDDI interfaces and the like. Generally, these interfaces may include ports appropriate for communication with the appropriate media. In some cases, they may also include an independent processor and, in some instances, volatile RAM. The independent processors may control such communications intensive tasks as packet switching, media control and management. By providing separate processors for the communications intensive tasks, these interfaces allow the master microprocessor 562 to efficiently perform routing computations, network diagnostics, security functions, etc.

Although the system shown in FIG. 5 is one specific network device of the present invention, it is by no means the only network device architecture on which the present invention can be implemented. For example, an architecture having a single processor that handles communications as well as routing computations, etc. is often used. Further, other types of interfaces and media could also be used with the router.

Regardless of the network device's configuration, it may employ one or more memories or memory modules (including memory 561) configured to store program instructions for the general-purpose network operations and mechanisms for roaming, route optimization and routing functions described herein. The program instructions may control the operation of an operating system and/or one or more applications, for example. The memory or memories may also be configured to store tables such as mobility binding, registration, and association tables, etc.

Figure 6:
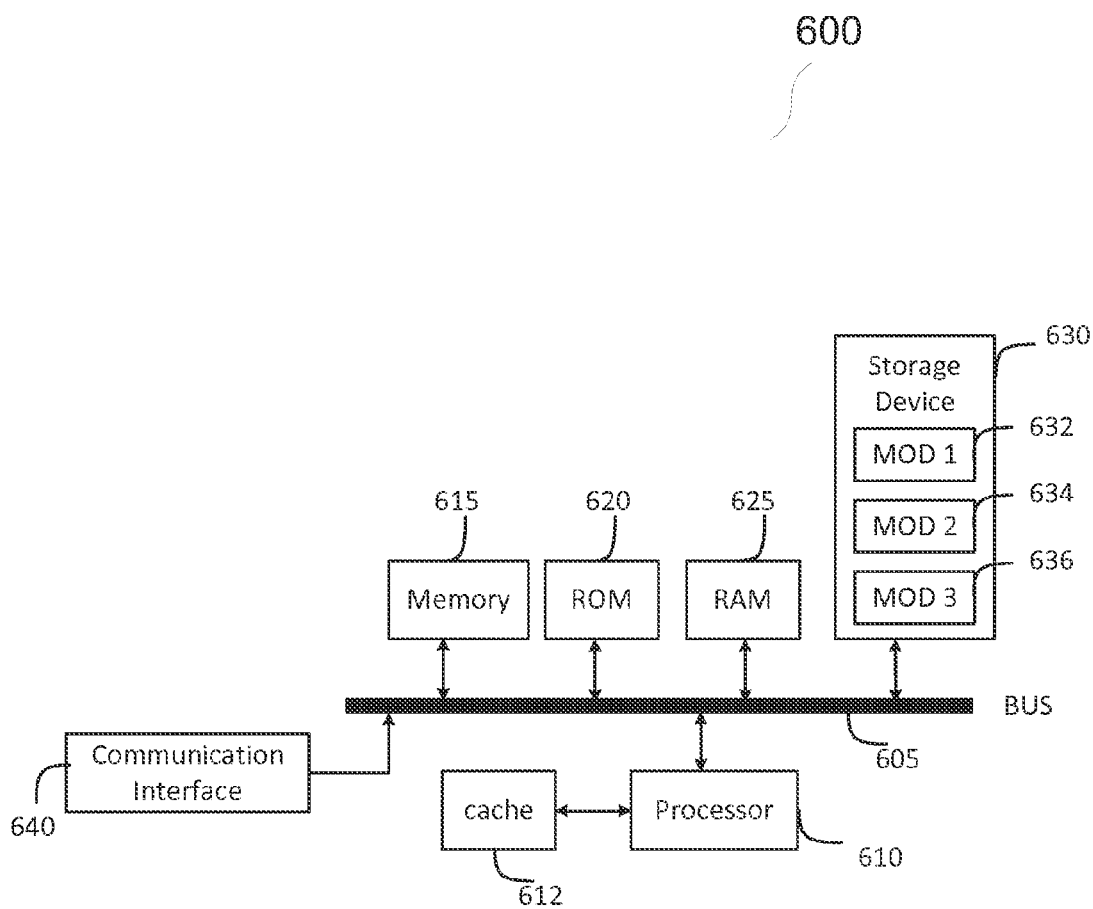
FIG. 6 illustrates an exemplary system in accordance with various embodiments.

FIG. 6 illustrates an exemplary system in accordance with various embodiments. The more appropriate embodiment will be apparent to those of ordinary skill in the art when practicing the present technology. Persons of ordinary skill in the art will also readily appreciate that other system embodiments are possible.

FIG. 6 illustrates an example of a system bus computing system architecture 600 wherein the components of the system are in electrical communication with each other using a bus 605. Exemplary system 600 includes a processing unit (CPU or processor) 610 and a system bus 605 that couples various system components including the system memory 615, such as read only memory (ROM) 620 and random access memory (RAM) 625, to the processor 610. The system 600 can include a cache of high-speed memory connected directly with, in close proximity to, or integrated as part of the processor 610. The system 600 can copy data from the memory 615 and/or the storage device 630 to the cache 612 for quick access by the processor 210. In this way, the cache can provide a performance boost that avoids processor 610 delays while waiting for data. These and other modules can control or be configured to control the processor 610 to perform various actions. Other system memory 615 may be available for use as well. The memory 615 can include multiple different types of memory with different performance characteristics. The processor 610 can include any general purpose processor and a hardware module or software module, such as module 632, module 634, and module 636 stored in storage device 630, configured to control the processor 610 as well as a special-purpose processor where software instructions are incorporated into the actual processor design. The processor 610 may essentially be a completely self-contained computing system, containing multiple cores or processors, a bus, memory controller, cache, etc. A multi-core processor may be symmetric or asymmetric.

The communications interface 640 can generally govern and manage the user input and system output. There is no restriction on operating on any particular hardware arrangement and therefore the basic features here may easily be substituted for improved hardware or firmware arrangements as they are developed.

Storage device 630 is a non-volatile memory and can be a hard disk or other types of computer readable media which can store data that are accessible by a computer, such as magnetic cassettes, flash memory cards, solid state memory devices, digital versatile disks, cartridges, random access memories (RAMs) 625, read only memory (ROM) 620, and hybrids thereof.

The storage device 630 can include software modules 632, 634, 636 for controlling the processor 610. Other hardware or software modules are contemplated. The storage device 630 can be connected to the system bus 605. In one aspect, a hardware module that performs a particular function can include the software component stored in a computer-readable medium in connection with the necessary hardware components, such as the processor 610, bus 605, display (not shown), and so forth, to carry out the function.

For clarity of explanation, in some instances the present technology may be presented as including individual functional blocks including functional blocks comprising devices, device components, steps or routines in a method embodied in software, or combinations of hardware and software.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, flash memory, USB devices provided with non-volatile memory, networked storage devices, and so on.

Devices implementing methods according to these disclosures can comprise hardware, firmware and/or software, and can take any of a variety of form factors. Typical examples of such form factors include laptops, smart phones, small form factor personal computers, personal digital assistants, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Various embodiments of the present disclosure provide methods for prioritizing network flows and providing differentiated quality of service. While specific examples have been cited above showing how the optional operation may be employed in different instructions, other embodiments may incorporate the optional operation into different instructions. For clarity of explanation, in some instances the present disclosure may be presented as including individual functional blocks including functional blocks comprising devices, device components, steps or routines in a method embodied in software, or combinations of hardware and software.

The various embodiments can be further implemented in a wide variety of operating environments, which in some cases can include one or more server computers, user computers or computing devices which can be used to operate any of a number of applications. User or client devices can include any of a number of general purpose personal computers, such as desktop or laptop computers running a standard operating system, as well as cellular, wireless and handheld devices running mobile software and capable of supporting a number of networking and messaging protocols. Such a system can also include a number of workstations running any of a variety of commercially-available operating systems and other known applications for purposes such as development and database management. These devices can also include other electronic devices, such as dummy terminals, thin-clients, gaming systems and other devices capable of communicating via a network.

To the extent embodiments, or portions thereof, are implemented in hardware, the present invention may be implemented with any or a combination of the following technologies: a discrete logic circuit(s) having logic gates for implementing logic functions upon data signals, an application specific integrated circuit (ASIC) having appropriate combinational logic gates, programmable hardware such as a programmable gate array(s) (PGA), a field programmable gate array (FPGA), etc.

Most embodiments utilize at least one network that would be familiar to those skilled in the art for supporting communications using any of a variety of commercially-available protocols, such as TCP/IP, OSI, FTP, UPnP, NFS, CIFS, AppleTalk etc. The network can be, for example, a local area network, a wide-area network, a virtual private network, the Internet, an intranet, an extranet, a public switched telephone network, an infrared network, a wireless network and any combination thereof.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, flash memory, USB devices provided with non-volatile memory, networked storage devices, and so on.

Devices implementing methods according to these disclosures can comprise hardware, firmware and/or software, and can take any of a variety of form factors. Typical examples of such form factors include server computers, laptops, smart phones, small form factor personal computers, personal digital assistants, and so on. Functionality described herein also can be embodied in peripherals or add-in cards. Such functionality can also be implemented on a circuit board among different chips or different processes executing in a single device, by way of further example.

In embodiments utilizing a Web server, the Web server can run any of a variety of server or mid-tier applications, including HTTP servers, FTP servers, CGI servers, data servers, Java servers and business application servers. The server(s) may also be capable of executing programs or scripts in response requests from user devices, such as by executing one or more Web applications that may be implemented as one or more scripts or programs written in any programming language, such as Java®, C, C# or C++ or any scripting language, such as Perl, Python or TCL, as well as combinations thereof. The server(s) may also include database servers, including without limitation those commercially available from open market.

The server farm can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch-sensitive display element or keypad) and at least one output device (e.g., a display device, printer or speaker). Such a system may also include one or more storage devices, such as disk drives, optical storage devices and solid-state storage devices such as random access memory (RAM) or read-only memory (ROM), as well as removable media devices, memory cards, flash cards, etc.

Such devices can also include a computer-readable storage media reader, a communications device (e.g., a modem, a network card (wireless or wired), an infrared computing device) and working memory as described above. The computer-readable storage media reader can be connected with, or configured to receive, a computer-readable storage medium representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs such as a client application or Web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and computing media, such as but not limited to volatile and non-volatile, removable and non-removable media implemented in any method or technology for storage and/or transmission of information such as computer readable instructions, data structures, program modules or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A computer-implemented method, comprising:
    partitioning each of two or more fabric modules (FMs) into two or more banks, wherein the partitioning comprises associating at least two chipsets for each of the two or more FMs into different banks selected from among the two or more banks;
    dynamically assigning two or more entries in a LPM table of a line card (LC) at least based upon routes that are dynamically learned at the LC;
    programming the two or more banks in each of the two or more FMs based upon the dynamically assigned two or more entries in the LPM table;
    in response to receiving a Layer-3 packet, looking up the Layer-3 packet in the LPM table of the LC to determine a particular bank in one of the two or more FMs for routing the Layer-3 packet; and
    routing the Layer-3 packet to the particular bank.

2. The computer-implemented method of claim 1, further comprising:
    assigning a virtual module (VM) identifier to each of the two or more banks in one of the two or more FMs.

3. The computer-implemented method of claim 2, wherein forwarding the Layer-3 packet among the two or more banks of the two or more FMs is based at least upon assigned VM identifiers of the two or more banks in the two or more FMS.

4. The computer-implemented method of claim 1, further comprising:
    increasing, based upon participation of the LC in virtual routing and forwarding (VRF) or virtual design and construction (VDC), a number of the routes using a selective download.

5. The computer-implemented method of claim 1, further comprising:
    adding an additional entry to the LPM table of the LC based upon the routes that are dynamically learned; and
    hashing the additional entry to one of the two or more banks in one of the two or more FMs.

6. The computer-implemented method of claim 1, further comprising:
    in response to the routes at the LC becoming too granular to fit in the LPM table, aggregating the routes up by 1 bit-level.

7. The computer-implemented method of claim 1, further comprising:
    measuring traffic flows on each of the two or more banks in the two or more FMs;
    based upon measured traffic flows on the two or more banks in the two or more FMs, determining a new bank in the two or more FMs for at least one route to the LC, the new bank being different from an existing bank for the at least one route to the LC; and switching the at least one route from the existing bank in the two or more FMs to the new bank in the two or more FMs.

8. The computer-implemented method of claim 7, further comprising:
adding a pre-determined delay to a determination of whether to switch the route from the existing bank in the two or more FMs to the new bank in the two or more FMs.

9. The computer-implemented method of claim 7, further comprising:
in response to a determination to switch the route from the existing bank in the two or more FMs to the new bank in the two or more FMs, making both the existing bank and the new bank available before the route is switched from the existing bank to the new bank.

10. A system, comprising:
at least one processor; and
memory including instructions that, when executed by the at least one processor, cause the system to:
partition each of two or more fabric modules (FMs) into two or more banks, wherein the partitioning comprises associating at least two chipsets for each of the two or more FMs into different banks selected from among the two or more banks;
dynamically assign two or more entries in a LPM table of a line card (LC) at least based upon routes that are dynamically learned at the LC;
program the two or more banks in each of the two or more FMs based upon the dynamically assigned two or more entries in the LPM table;
in response to receiving a Layer-3 packet, look up the Layer-3 packet in the LPM table of the LC to determine a particular bank in one of the two or more FMs for routing the Layer-3 packet; and
route the Layer-3 packet to the particular bank.

11. The system of claim 10, wherein the instructions when executed further cause the system to:
assign a virtual module (VM) identifier to each of the two or more banks in one of the two or more FMs.

12. The system of claim 11, wherein forwarding of the Layer-3 packet among the two or more banks of the two or more FMs is based at least upon assigned VM identifiers of the two or more banks in the two or more FMs.

13. The system of claim 10, wherein the instructions when executed further cause the system to:
add an additional entry to the LPM table of the LC based upon the routes that are dynamically learned; and
hash the additional entry to one of the two or more banks in one of the two or more FMs.

14. The system of claim 10, wherein the instructions when executed further cause the system to:
in response to the routes at the LC becoming too granular to fit in the LPM table, aggregate the routes up by 1 bit-level.

15. The system of claim 10, wherein the instructions when executed further cause the system to:
measure traffic flows on each of the two or more banks in the two or more FMs;
based upon measured traffic flows on the two or more banks in the two or more FMs, determine a new bank in the two or more FMs for at least one route to the LC, the new bank being different from an existing bank for the at least one route to the LC; and
switch the at least one route from the existing bank in the two or more FMs to the new bank in the two or more FMs.

16. The system of claim 15, wherein the instructions when executed further cause the system to:
add a pre-determined delay to a determination whether to switch the route from the existing bank in the two or more FMs to the new bank in the two or more FMs.

* * * * *